US012701021B2

(12) United States Patent

Schlabeck

(10) Patent No.: US 12,701,021 B2
(45) Date of Patent: Aug. 4, 2026

(54) NETWORK COUPLING DEVICE FOR A NETWORK AND NETWORK WITH A NETWORK COUPLING DEVICE

(71) Applicant: Phoenix Contact GmbH & Co. KG, Blomberg (DE)

(72) Inventor: Tarek Schlabeck, Kirchlengern (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 190 days.

(21) Appl. No.: 18/686,888

(22) PCT Filed: Aug. 17, 2022

(86) PCT No.: PCT/EP2022/072985
§ 371 (c)(1),
(2) Date: Feb. 27, 2024

(87) PCT Pub. No.: WO2023/030892
PCT Pub. Date: Mar. 9, 2023

(65) Prior Publication Data
US 2025/0132937 A1 Apr. 24, 2025

(30) Foreign Application Priority Data

Aug. 30, 2021 (LU) .................................. LU500592

(51) Int. Cl.
*H04L 12/10* (2006.01)
*H04L 49/351* (2022.01)

(52) U.S. Cl.
CPC ............ *H04L 12/10* (2013.01); *H04L 49/352* (2013.01)

(58) Field of Classification Search
CPC ......... H04L 12/02; H04L 12/10; H04L 12/12; H04L 45/00; H04L 45/16; H04L 45/30;
(Continued)

(56) References Cited

U.S. PATENT DOCUMENTS 7,859,427 B2 * 12/2010 Blanke .............. H02M 3/33523
340/870.31
9,438,744 B2 * 9/2016 Klocke ................ H04M 11/062
(Continued)

OTHER PUBLICATIONS

Microsemi, "MAX24287 1Gbps Parallel-to-Serial MII Converter General Description", Apr. 30, 2019 (Apr. 30, 2019), p. 1-72, Retrieved from the Internet: URL:https://ww1.microship.com/downloads/en/DeviceDoc/MAX24287-data-sheet-2019-04.pdf; XP055914377; [retrieved on Apr. 21, 2022] ; 1-10; abstract; p. 6-p. 7.

*Primary Examiner* — James M Perez
(74) *Attorney, Agent, or Firm* — LEYDIG, VOIT & MAYER, LTD.

(57) ABSTRACT
A network coupling device for coupling at least one appliance to a network via an electrical line includes: at least one terminal unit for connecting the at least one appliance to the network coupling device via the electrical line; at least one transceiver unit assigned to the at least one terminal unit, the at least one transceiver unit coupling at least one signal into and/or out of the line; a control unit for transmitting the at least one signal to the at least one appliance and/or receiving the at least one signal from the at least one appliance via the at least one transceiver unit and the at least one terminal unit; and at least one conversion module arranged between the at least one transceiver unit and the control unit, the at least one conversion module converting the at least one signal.

19 Claims, 4 Drawing Sheets

(58) Field of Classification Search
CPC ......... H04L 45/52; H04L 45/60; H04L 49/00;
H04L 49/25; H04L 49/253; H04L 49/254;
H04L 49/35; H04L 49/351; H04L 49/352;
H04L 49/60; H04L 49/604
See application file for complete search history.

(56) References Cited

U.S. PATENT DOCUMENTS

| | | | | |
|---|---|---|---|---|
| 10,143,102 | B2* | 11/2018 | Bury | H05K 7/1477 |
| 10,291,461 | B2* | 5/2019 | Müller | H04L 12/66 |
| 10,320,191 | B2* | 6/2019 | Kalhoff | H04L 12/40045 |
| 10,523,402 | B1* | 12/2019 | Pabst | H04L 5/14 |
| 11,108,842 | B2* | 8/2021 | Pandey | H04L 25/493 |
| 11,431,468 | B2* | 8/2022 | Iyer | H04L 12/40013 |
| 11,516,855 | B2* | 11/2022 | Chen | H04L 7/02 |
| 11,677,573 | B2* | 6/2023 | Klein | H04L 12/10 |
| | | | | 455/41.1 |
| 11,943,000 | B2* | 3/2024 | Soto | H04B 10/808 |
| 12,267,124 | B2* | 4/2025 | Angelov | H04L 12/10 |
| 12,476,834 | B2* | 11/2025 | Swarr | H04L 12/10 |
| 2002/0063924 | A1* | 5/2002 | Kimbrough | H04B 10/272 |
| | | | | 398/79 |
| 2004/0190547 | A1* | 9/2004 | Gordy | H04L 63/1408 |
| | | | | 370/463 |
| 2005/0122689 | A1* | 6/2005 | Pozzuoli | H05K 7/1092 |
| | | | | 361/704 |
| 2006/0013198 | A1* | 1/2006 | Shore | H04L 49/604 |
| | | | | 370/352 |
| 2007/0041568 | A1* | 2/2007 | Ghoshal | H04L 12/10 |
| | | | | 379/324 |
| 2007/0110081 | A1* | 5/2007 | Miller | H04L 12/40006 |
| | | | | 370/401 |
| 2007/0121676 | A1* | 5/2007 | Koga | H04L 5/1438 |
| | | | | 370/482 |
| 2007/0121930 | A1* | 5/2007 | Koga | H04B 3/542 |
| | | | | 379/413.03 |
| 2008/0095218 | A1* | 4/2008 | Murray | H03M 5/145 |
| | | | | 375/150 |
| 2008/0247394 | A1* | 10/2008 | Kadambi | H04L 49/351 |
| | | | | 370/392 |
| 2009/0243765 | A1* | 10/2009 | Blanke | H02M 3/33523 |
| | | | | 333/24 R |
| 2013/0177015 | A1* | 7/2013 | House | H04J 3/0605 |
| | | | | 370/389 |
| 2014/0023068 | A1* | 1/2014 | Kim | H04L 12/40006 |
| | | | | 370/355 |
| 2016/0286674 | A1* | 9/2016 | Bury | H01R 9/2425 |
| 2018/0062985 | A1* | 3/2018 | Iwasaki | H04L 49/355 |
| 2018/0062987 | A1* | 3/2018 | Badillo | H04L 12/66 |
| 2019/0261420 | A1* | 8/2019 | Pannell | H04W 74/0825 |
| 2020/0067727 | A1* | 2/2020 | Pannell | H04L 47/34 |
| 2020/0106639 | A1* | 4/2020 | Pannell | H04L 12/40136 |
| 2020/0127451 | A1* | 4/2020 | Elberbaum | H02G 3/083 |
| 2020/0136993 | A1* | 4/2020 | Yun | H04L 69/323 |
| 2020/0195450 | A1* | 6/2020 | Bains | G06F 13/1668 |
| 2020/0203898 | A1* | 6/2020 | Butcher | H04L 49/15 |
| 2020/0252159 | A1* | 8/2020 | Kim | H04L 1/0061 |
| 2021/0006344 | A1* | 1/2021 | Chen | G01S 19/14 |
| 2021/0006432 | A1* | 1/2021 | Krieger | H04L 12/40163 |
| 2021/0044460 | A1* | 2/2021 | Langner | H04L 12/40013 |
| 2021/0067193 | A1* | 3/2021 | Dai | H04B 3/50 |
| 2021/0144207 | A1* | 5/2021 | Yasay | H04L 67/1097 |
| 2021/0152605 | A1* | 5/2021 | Mizrahi | H04L 63/10 |
| 2021/0267101 | A1* | 8/2021 | Huang | H01R 13/6592 |
| 2021/0286748 | A1* | 9/2021 | Brychta | G06F 13/4068 |
| 2021/0334232 | A1* | 10/2021 | Islinger | G06F 13/4221 |
| 2022/0045876 | A1* | 2/2022 | Yasunori | H01R 12/75 |
| 2022/0048446 | A1* | 2/2022 | Yasunori | H04L 12/40032 |
| 2022/0166523 | A1* | 5/2022 | Soto | H04B 10/808 |
| 2022/0278709 | A1* | 9/2022 | Angelov | H04L 12/10 |
| 2023/0299936 | A1* | 9/2023 | Kim | H04L 7/0012 |
| 2023/0412406 | A1* | 12/2023 | De Bruijn | H04L 12/40045 |
| 2025/0023754 | A1* | 1/2025 | Pannell | H04L 12/40013 |
| 2025/0132937 | A1* | 4/2025 | Schlabeck | H04L 12/40006 |
| 2025/0202731 | A1* | 6/2025 | Griffiths | H04L 12/10 |

* cited by examiner

PRIOR ART

PRIOR ART

NETWORK COUPLING DEVICE FOR A NETWORK AND NETWORK WITH A NETWORK COUPLING DEVICE

CROSS-REFERENCE TO PRIOR APPLICATIONS

This application is a U.S. National Phase application under 35 U.S.C. § 371 of International Application No. PCT/EP2022/072985, filed on Aug. 17, 2022, and claims benefit to Luxembourg Patent Application No. LU 500592, filed on Aug. 30, 2021. The International Application was published in German on Mar. 9, 2023 as WO/2023/030892 under PCT Article 21(2).

FIELD

The present invention relates to a network coupling device for coupling terminal devices to a network, preferably to an Ethernet network.

BACKGROUND

The so-called Industrial Internet of Things (IIoT) places special demands on network technology for process automation, for example in the field of Industrial Ethernet in the manufacturing and process industry. On the one hand, many network participants, i.e. end devices (or terminals), should be able to be connected to the network as easily as possible in the future, which will lead to the miniaturization of network technology. On the other hand, however, the need to transmit large amounts of data and thus high data transmission rates is also increasing, particularly through the use of artificial intelligence (AI) technologies, for example.

In view of the special requirements of the manufacturing and process industry, the Ethernet Advanced Physical Layer (Ethernet APL) standard was developed, which represents an additional physical layer of Ethernet communication technology according to the ISO/OSI 7-layer model and thus regulates the coding of bits into electrical signals and the transmission of electrical signals (pulses). Instead of 8-wire lines with four pairs of wires, two-wire lines are used here. This means, for example, that many small end devices (or terminals), such as sensors, switches and operating elements, may be relatively easily coupled to a control network via an Ethernet switch as a coupling device. The data transmission rate of 10 Mbit/s is sufficient for such end devices (or terminals).

Furthermore, the term "IEEE Std 802.3cg™-2019" defines or specifies the further developed Ethernet data transmission standard for wired communication in the area of local area networks (LAN), which enables data transmission rates of 10 Mbit/s. The transmission of data, i.e. Ethernet signals, takes place via a line which, as described above, consists of two individual wires, i.e. two insulated copper-based electrical wires. The trunk line ("trunk") of such a network may be a maximum of 1000 m long, and spur lines ("spurs") may be a maximum of 200 m long. The two individual wires of the single wire pair are preferably twisted together. Such lines are also referred to as "twisted pair cables". The transmission protocol of this network standard, which is also referred to as "single-pair Ethernet", is real-time capable and enables simple and robust cabling.

To provide the data transmission technology described above using electrical signals, semiconductor-based single-channel transceiver units ("physical layer (PHY) transceivers"), i.e. single-channel Ethernet transceivers, are known from the prior art, which are compliant with the IEEE 802.3cg™ 10Base-TIL specification and may transmit Ethernet signals with a data transmission rate of 10 Mbit/s using a single connected twisted-pair two-wire cable. These are, for example, the single-pair Ethernet PHY devices "DP83TD510E" from Texas Instruments Incorporated and "ADIN1100" from Analog Devices, Inc.

However, these transceiver units of the physical layer are designed according to the ISO/OSI 7-layer model as single-channel transceiver units ("single-port transceivers") for end devices with a single channel and thus with an external interface and not for Ethernet switches, i.e. coupling devices with multi-channel transceiver units for high data transmission rates of 1 Gbit/s, for example, and smaller maximum line lengths of 100 m, for example. One channel of the transceiver unit provides a port, i.e. an external interface.

Additional measures are required to provide the functionality of such single-channel transceiver units, i.e. those described above, as part of an Ethernet switch. For example, an interface converter in the form of a programmable logic circuitry of an integrated circuit ("Field Programmable Gate Array (FPGA)") is used to achieve adaptation to the transmission standard. However, the use of a programmable logic circuitry, i.e. an FPGA component, results in a high development effort and also causes high manufacturing and product costs.

Semiconductor-based control modules for Ethernet switches are also known, which enable direct coupling to corresponding single-channel transceiver units, but offer a very small number of channels, i.e. ports and thus external interfaces. The usual number is 5 channels/ports.

In order to increase the number of channels and thus available ports, a plurality of control modules may be cascaded accordingly. However, cascading, i.e. the cascading depth, is limited by increasing latency times when transmitting data, i.e. Ethernet signals, which in turn has a detrimental effect on the reliability of data transmission.

SUMMARY

In an embodiment, the present invention provides a network coupling device for coupling at least one appliance to a network via an electrical line, the network coupling device comprising: at least one terminal unit configured to connect the at least one appliance to the network coupling device via the electrical line; at least one transceiver unit assigned to the at least one terminal unit, the at least one transceiver unit being configured to couple at least one signal into and/or out of the line; a control unit configured to transmit the at least one signal to the at least one appliance and/or to receive the at least one signal from the at least one appliance via the at least one transceiver unit and the at least one terminal unit; and at least one conversion module arranged between the at least one transceiver unit and the control unit, the at least one conversion module being configured to convert the at least one signal for transmission between the control unit and the at least one transceiver unit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
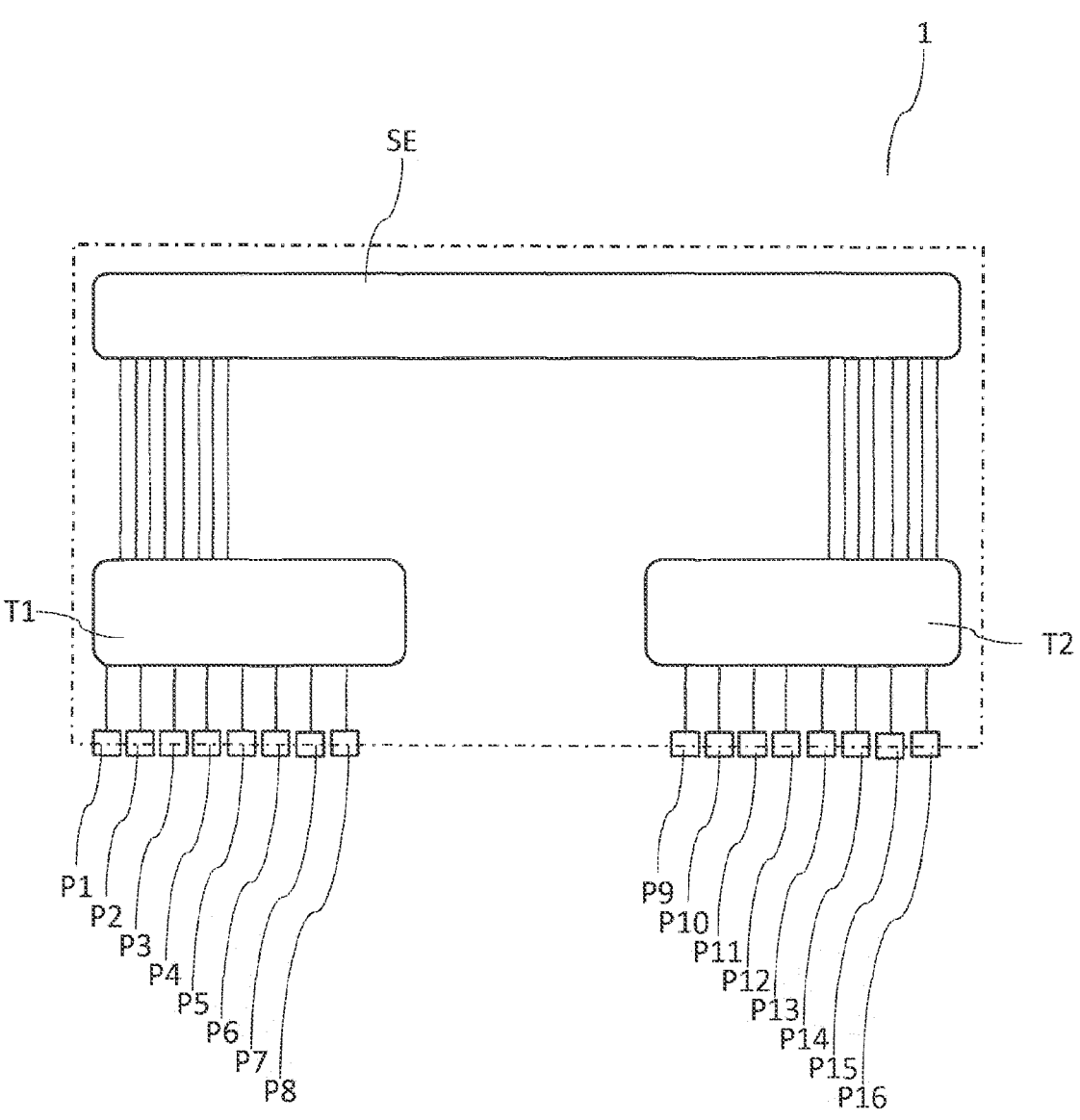
FIG. 1 a schematic structure of a first example of a network coupling device according to the state of the art.

In an embodiment, the present invention provides a network coupling device, preferably a Fast Ethernet switch or a Gigabit Ethernet switch, which is configured to easily comprise at least the functionality of at least one single-channel transceiver unit according to the IEEE Std 802.3cg™-2019 data transmission standard.

According to a first general aspect, the invention relates to a network coupling device, preferably an Ethernet switch, for coupling at least one appliance (or device), preferably a terminal device, to a network, preferably an Ethernet network, via an electrical line, having at least one terminal unit for connection of the at least one appliance to the network coupling device via the electrical line, and at least one transceiver unit, the at least one transceiver unit being assigned to the at least one terminal unit and being configured for coupling and/or decoupling at least one signal into and/or out of the line, and with a control unit, wherein the control unit is configured to transmit (or conduct) to the appliance and/or to receive from the appliance the at least one signal via the at least one transceiver unit and the at least one terminal unit, wherein the network coupling device comprises at least one conversion module, wherein the at least one conversion module is arranged between the at least one transceiver unit and the control unit and is configured to convert the at least one signal for transmission between the control unit and the at least one transceiver unit.

This may, for example, provide a network coupling device that is configured as an Ethernet gigabit switch and has at least one single-channel transceiver, which is configured for coupling terminal devices that require comparatively low data transmission rates via a two-wire line.

According to a further aspect of the invention, it may be provided that the control unit comprises a control unit interface element and the at least one transceiver unit comprises a transceiver unit interface element, and the control unit is coupled to the at least one conversion module via the control unit interface element and the at least one transceiver unit is coupled to the at least one conversion module via the transceiver unit interface element.

The at least one conversion module makes it possible to operate modern network coupling devices, i.e. switches with Gigabit Ethernet-capable interfaces, together with available TIL transceivers, i.e. TIL (PHY) transceivers.

It is possible that the control unit interface element is configured as an SGMII interface (Serial Gigabit Media-Independent Interface (SGMII) interface) or as a QSGMII interface (Quad Serial Gigabit Media-Independent Interface (QSGMII) interface), or comprises an SGMII interface functionality and/or a QSGMII interface functionality.

According to a further aspect of the invention, it may be provided that the transceiver unit interface element is configured as a Reduced Media-Independent Interface (RMII) interface and/or comprises RMII interface functionality.

Alternatively, it is possible that the at least one conversion module comprises a first interface element for coupling with the control unit and a second interface element for coupling with the at least one transceiver unit, wherein the first interface element is configured as an SGMII interface or as a QSGMII interface, or comprises an SGMII interface functionality or a QSGMII interface functionality; and/or wherein the second interface element is configured as an RMII interface or comprises an RMII interface functionality.

According to a further aspect of the invention, it may be provided that the control unit is configured and/or configured according to the Fast Ethernet data transmission standard or preferably according to the Gigabit Ethernet data transmission standard.

It is possible that the at least one transceiver unit is configured and/or configured as an Ethernet physical layer (PHY) transceiver; and/or is configured and/or specified according to the Ethernet data transmission standard IEEE Std 802.3cg™-2019 (10BASE TIL) and preferably provides a data transmission rate of at least up to 10 Mbits/s for coupling and/or tapping (or extracting or decoupling) the at least one signal.

It is possible that the at least one terminal unit is configured as a port, preferably as an RJ-45 connection socket. Alternatively, it is also possible that the at least one terminal unit is configured as a socket according to another specification and/or standard.

It is possible that the network coupling device additionally comprises at least one terminal unit configured as a small form-factor pluggable (SFP) port.

According to a further aspect of the present invention, it may be provided that the at least one conversion module is configured and/or configured to supply and/or operate the at least one transceiver unit with a clock of substantially 50 MHz and/or with at least 50 MHz, preferably when the transceiver unit interface element is configured as a reduced media-independent interface (RMII) interface and/or comprises an RMII interface functionality.

An external clock supply via a quartz crystal, for example, is therefore unnecessary. This may save additional components or elements of the network coupling device.

According to a second general aspect, the invention relates to a network comprising at least one network coupling device as disclosed herein.

Identical or functionally equivalent components or elements are marked with the same reference numerals in the figures. For their explanation, reference is also made in part to the description of other embodiments and/or figures in order to avoid repetition.

The following detailed description of the embodiments shown in the figures is for the purpose of further illustration or clarification and is in no way intended to limit the scope of the present invention.

Figure 2:
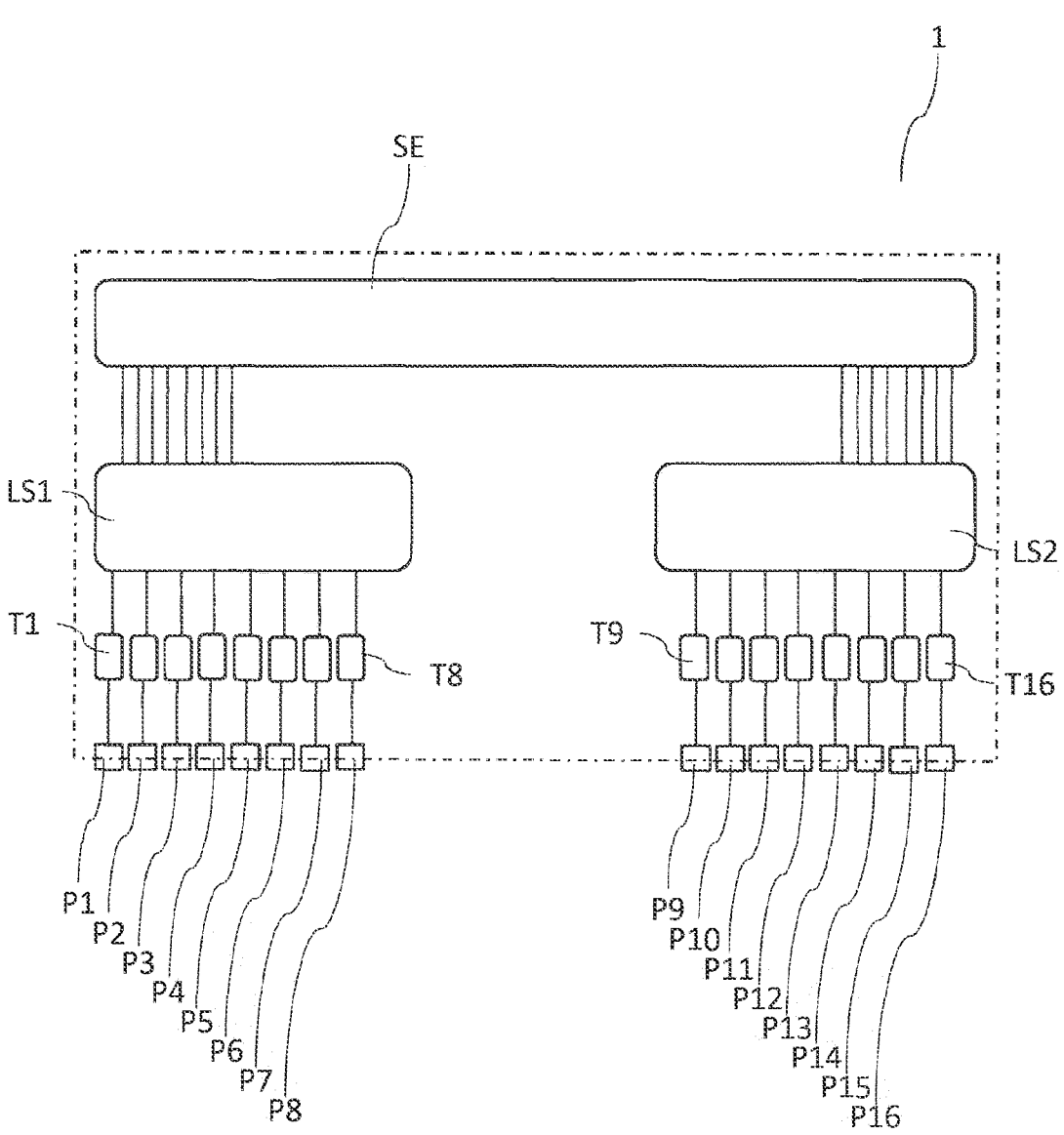
FIG. 2 a schematic structure of a second example of a network coupling device according to the state of the art.
Figure 3:
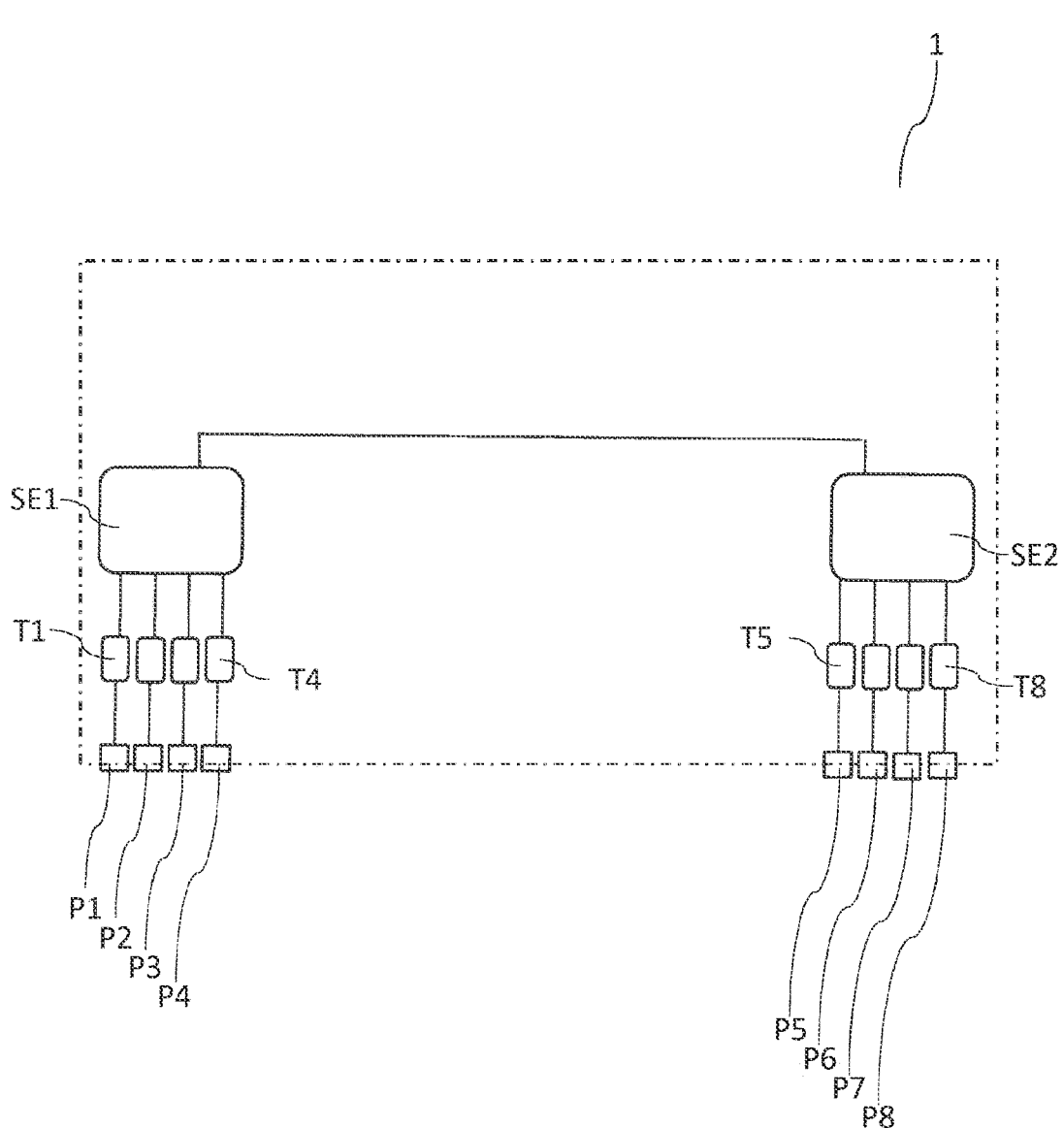
FIG. 3 a schematic structure of a third example of a network coupling device according to the state of the art.

FIGS. 1 to 3 each show a schematic structure of examples of a network coupling device 1 which are known from the prior art. The description of the schematically illustrated, known network coupling devices 1 is limited to essential components and elements in connection with the physical layer according to the ISO/OSI 7 layer model.

FIG. 1 shows a schematic structure of a first example of a network coupling device 1, which is known from the prior art and is used for coupling network subscribers to a network.

The network coupling device 1 is configured as an Ethernet switch and is specified, for example, as a Gigabit Ethernet switch according to the data transmission standard IEEE 802.3ab™ (1000BASE-T), in which four wire pairs and thus 8 wires of the twisted pair copper cable are used for the transmission of data. When coupling to an Ethernet network, the network coupling device 1 divides the Ethernet network into two segments.

The network coupling device 1 in FIG. 1 comprises a control unit SE as an Ethernet switch controller. Furthermore, the network coupling device 1 comprises a first transceiver unit T1 and a second transceiver unit T2. Both the first transceiver unit T1 and the second transceiver unit T2 are provided for converting bits into electrical signals, i.e. electrical pulses, and are therefore used for transmitting and receiving signals via the transmission medium, which in the present case of the network coupling device 1 as an Ethernet switch is a copper cable in the form of a twisted pair cable. In other words, the transceiver units T1 and T2 are physical add-on chips and are also referred to as "gigabit physical layer (PHY) transceivers".

Each of the transceiver units T1 and T2 comprises 8 channels, so that the network coupling device 1 has a total of 16 terminal units, i.e. (gigabit) ports P1 to P16 in the form of RJ45 connection sockets.

FIG. 2 shows a schematic structure of a second example of a programmable network coupling device 1 according to the state of the art. The network coupling device 1 is also configured here as an Ethernet switch. With regard to data transmission, the network coupling device 1 is specified in accordance with the IEEE 802.3cg™-2019 (10BASE-TIL) standard or conforms to it, whereby semiconductor-based, programmable logic circuits LS1 and LS2 are used. In other words, the network coupling device 1 in FIG. 2 comprises two so-called "field programmable gate arrays" (FPGA) LS1 and LS2, each of which is a programmable digital component which, on the one hand, is directly connected to the control unit SE of the network coupling device 1 and, on the other hand, each has 8 channels for coupling 8 single-channel transceiver units T1, . . . , T16. The single-channel transceiver units T1 to T16 are thus each configured as single-pair Ethernet PHY transceivers and each enable a data transmission rate of 10 Mbit/s via a twisted-pair two-wire line (not shown in FIG. 2). Terminal units P1 to P16, which are configured as RJ45 connection sockets, for example, are used to connect the twisted-pair lines. Alternatively, connection sockets according to other specifications may also be used. As already described above, the use of programmable logic circuitry LS1, LS2, i.e. FPGA components, requires a high level of development effort as well as high manufacturing and product costs.

FIG. 3 shows a schematic structure of a third example of a network coupling device 1 according to the prior art.

The network coupling device 1 is also configured here as an Ethernet switch and is specified in accordance with or conforms to the data transmission standard IEEE 802.3cg™-2019 (10BASE-TIL).

The network coupling device 1 is characterized by cascading, according to which a first control unit SE1 and a second control unit SE2 are connected to each other via a terminal unit (uplink port) (not marked in detail in FIG. 3).

Each of the control units SE1 and SE2 has 4 channels for coupling 4 single-channel transceiver units T1 to T4 and T5 to T8. The single-channel transceiver units T1 to T4 and T5 to T8 are in turn connected to corresponding terminal units (e.g. ports/RJ45 connection sockets) P1 to P4 and P5 to P8.

Although the example of the network coupling device 1 shown schematically in FIG. 3 enables a data transmission rate of 10 Mbit/s, the use of two or, more generally, a plurality of control units SE1, SE2 in turn causes a certain delay in the transmission of data, which increases the latency of the network coupling device 1 and of the network as a whole.

Figure 4:
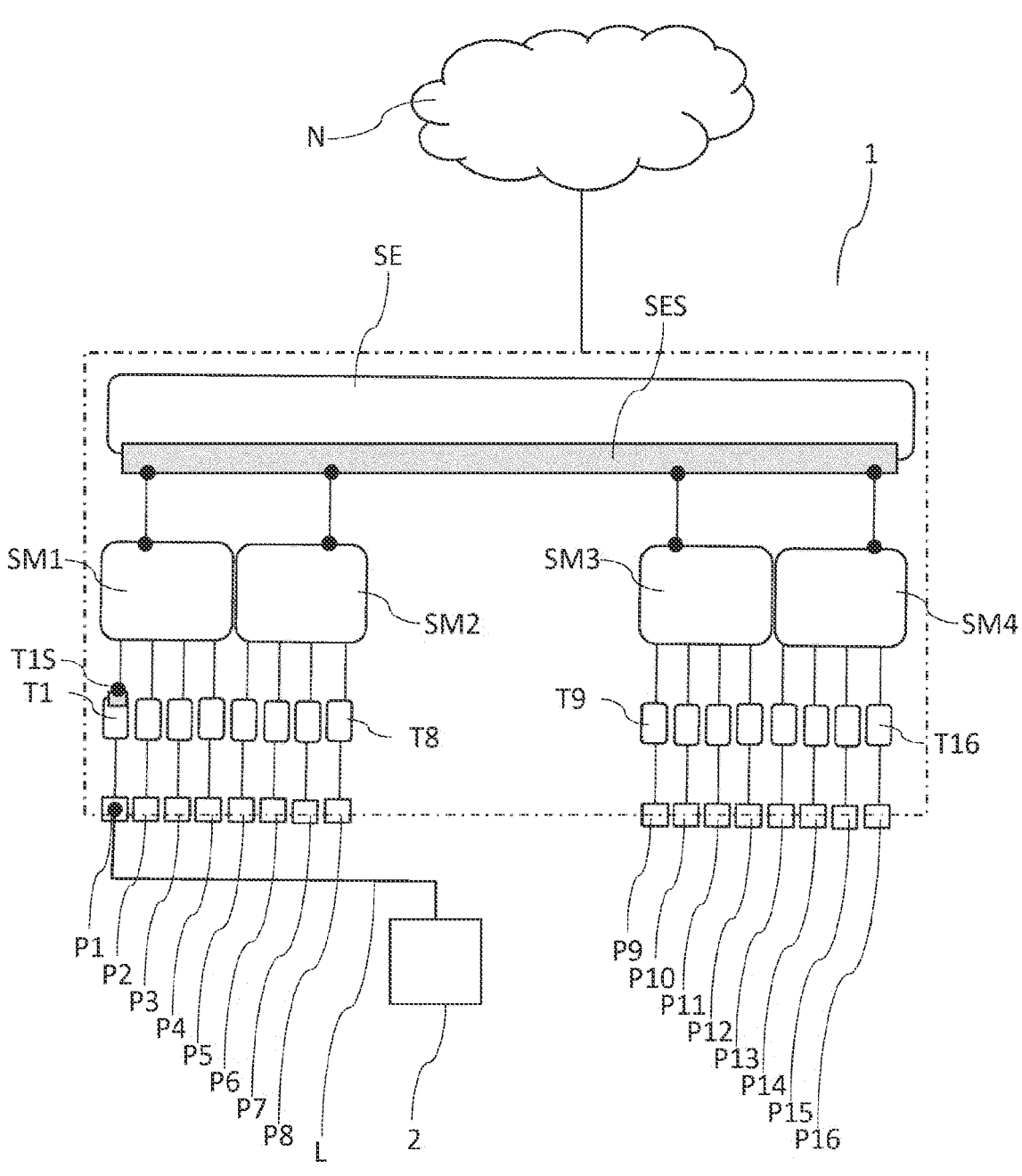
FIG. 4 a schematic structure of an example of a network coupling device according to the present invention.

FIG. 4 now shows a schematic structure of an example of a network coupling device 1 according to the present invention.

The network coupling device 1 according to the present invention is preferably configured according to the Ethernet standard for wired networks N for transmitting data in the form of electrical signals, i.e. electrical pulses. The network coupling device 1 is an Ethernet switch which is adapted to industrial environmental conditions in the manufacturing and process industry and offers the possibility of coupling a large number of terminal appliances 2 (or terminal devices 2) with lower requirements in terms of data volume and/or data transmission rate to the network N, which will be described in more detail below.

FIG. 4 schematically shows an appliance (or device) to be connected to the network N, i.e. terminal device 2 (or end device 2). The terminal device 2 may be a field device in the field level, for example a sensor or an actuator (switch, control element, etc.), in order to control corresponding processes. The network N may preferably be a real-time capable control network.

The terminal device 2 is connected to the network coupling device 1 via a line L. The line L is a wired electrical line L and is preferably configured as a single-pair copper-based cable (two-wire line), i.e. comprising a pair of wires. The connection, i.e. a signal communication connection between the terminal device 2 and the network coupling device 1, is made at the network coupling device 1 via the terminal unit P1 of the network coupling device 1. A total of 16 terminal units P1 to P16 are shown in FIG. 4. The network coupling device 1 thus comprises 16 ports P1 to P16. The ports P1 to P16 may preferably be configured as RJ45 connection sockets for mechanical connection of the line(s) L via a plug-in connector in each case. It is possible that the ports P1 to P16 are also configured according to another specification and/or another standard.

Furthermore, the network coupling device comprises the transceiver units T1 to T8 and T9 to T16. The transceiver unit T1 assigned to the terminal device 2 is configured and/or specified as a so-called Ethernet physical layer (PHY) transceiver in accordance with the Ethernet data transmission standard IEEE Std 802.3cg™-2019 (10BASE TIL). The transceiver unit T1 is assigned to the bit transmission layer according to the ISO/OSI 7 layer model. In other words, the transceiver unit T1 is configured to couple at least one signal in the form of an electrical pulse into the line L for transmitting data and thus information and to send it to the terminal device 2. Furthermore, the transceiver unit T1 is configured to couple out and forward at least one signal in the form of an electrical pulse from the line L. The data transmission rate is 10 Mbit/s. The at least one signal may preferably be part of a data packet to be transmitted.

The transceiver unit T1 enables full-duplex data transmission via a single twisted-pair wire pair of the electrical line L, which means that smaller terminal devices in particular, as described above by way of example, may be coupled in a relatively simple manner and for which the specified data transmission rate is sufficient.

The transceiver unit T1 comprises corresponding components, elements and functions (e.g. Ethernet PHY core, input and output clock buffering, control register, subsystem register, circuitry for monitoring the power supply, MAC interface, control logic, etc.), which are not discussed in detail here.

The other transceiver units T2 to T8 and T9 to T16 are configured in the same way as the transceiver unit T1.

In the network coupling device 1 according to the present invention, the transceiver units T1 to T8 and T9 to T16 are each assigned as single-channel transceiver units to a terminal unit P1 to P16, that is, to a respective port P1 to P16.

The network coupling device 1 further comprises a control unit SE. The control unit SE is configured to transmit (or forward) to P16 to the appliance 2 (or device 2) and/or to receive from the appliance 2 (or device 2) the at least one signal via the at least one transceiver unit T1 to T16 and the respectively associated at least one terminal unit P1. The control unit SE is configured to transmit the at least one signal and preferably the Ethernet data packet behind it in accordance with a corresponding clock.

The control unit SE of the network coupling device 1 is preferably specified and/or configured according to the Fast Ethernet or particularly preferably according to the Gigabit Ethernet data transmission standard and is accordingly configured for data transmission rates of 100 Mbit/s or 1 Gbit/s.

The network coupling device 1 comprises at least 4 conversion modules SM1 to SM4. The respective conversion modules SM1 to SM4 are connected, on the one hand, to the respective transceiver units T1 to T16 and, on the other hand, to the control unit SE of the network coupling device 1. For this purpose, the control unit SE comprises a control unit interface element SES or is connected to a control unit interface element SES of the network coupling device 1. The control unit interface element SES is configured for coupling the at least 4 conversion modules SM1 to SM4. The conversion modules SM1 to SM4 are preferably each configured as a further, semiconductor-based switch module and are each connected to the control unit SE via an uplink port (not explicitly marked in FIG. 4 for reasons of clarity) via the control unit interface element SES. In other words, the control unit SE serves as the higher-level control unit SE of the network coupling device 1.

In the case of the terminal device 2, which is connected to the network coupling device 1 via the line L and the terminal unit P1, the conversion module SM1 ensures and/or the conversion module SM1 is configured to convert the at least one signal for transmission from the control unit SE to the transceiver unit T1, so that transmission of data via the network coupling device 1 is enabled.

The transceiver unit T1 is thus coupled to the control unit SE via the conversion module SM1.

The control unit interface element SES is preferably configured as a Serial Gigabit Media-Independent Interface (SGMII) interface or as a Quad Serial Gigabit Media-Independent Interface (QSGMII) interface, or comprises an SGMII interface functionality or a QSGMII interface functionality. The transceiver unit interface element T1S is configured as a Reduced Media-Independent Interface (RMII) interface and/or comprises an RMII interface.

The conversion module SM1 may further be configured and/or configured to supply and/or operate the respective transceiver unit T1 to T16 with a clock of substantially 50 MHz and/or of at least 50 MHz. In other words, a signal output with a corresponding frequency may be applied to the respective transceiver unit T1 to T16.

Alternatively, it is also possible that the conversion module SM1 comprises a first interface element for coupling with the at least one transceiver unit T1 and a second interface element for coupling with the control unit SE, wherein the first interface element is configured as an SGMII interface or as a QSGMII interface, or comprises an SGMII interface or a QSGMII interface. Furthermore, it is possible that the second interface element of the conversion module SM2 is configured as an RMII interface or comprises an RMII interface.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Network coupling device (switch)
2 Appliance (or device)/Terminal (or end device)
N Network
LS1, LS2 Programmable logic circuitry or Field Programmable Gate Array (FPGA)
P1, . . . , P16 Terminal unit (or connection unit; port)
SE, SE1, SE2 Control unit
SES Control unit interface element
SM1, . . . , SM4 Conversion module
T1, . . . , T16 Transceiver unit (PHY transceiver)
T1S Transceiver unit interface element

The invention claimed is:

1. A network coupling device for coupling at least one appliance to a network via an electrical line, the network coupling device comprising:

at least one terminal unit configured to connect the at least one appliance to the network coupling device via the electrical line;

at least one transceiver unit assigned to the at least one terminal unit, the at least one transceiver unit being configured to couple at least one signal into and/or out of the line;

a control unit configured to transmit the at least one signal to the at least one appliance and/or to receive the at least one signal from the at least one appliance via the at least one transceiver unit and the at least one terminal unit; and at least one conversion module arranged between the at least one transceiver unit and the control unit, the at least one conversion module being configured to convert the at least one signal for transmission between the control unit and the at least one transceiver unit.

2. The network coupling device of claim 1, wherein the control unit comprises a control unit interface element and the at least one transceiver unit comprises a transceiver unit interface element, and wherein the control unit is connected to the at least one conversion module via the control unit interface element and the at least one transceiver unit is coupled to the at least one conversion module via the transceiver unit interface element.

3. The network coupling device of claim 2, wherein the transceiver unit interface element comprises an RMII interface or an RMII interface functionality.

4. The network coupling device of claim 1, wherein the control unit interface element comprises an SGMII interface or a QSGMII interface, or comprises an SGMII interface functionality or a QSGMII interface functionality.

5. The network coupling device of claim 1, wherein the at least one conversion module has a first interface element configured to couple with the control unit and a second interface element configured to couple with the at least one transceiver unit, wherein the first interface element comprises an SGMII interface or a QSGMII interface, or comprises an SGMII interface functionality or a QSGMII interface functionality, and/or wherein the second interface element comprises an RMII interface or an RMII interface functionality.

6. The network coupling device of claim 1, wherein the control unit is configured according to the Fast Ethernet data transmission standard.

7. The network coupling device of claim 1, wherein the at least one transceiver unit comprises an Ethernet physical layer transceiver, and/or is configured and/or specified according to the Ethernet data transmission standard IEEE Std 802.3cg™-2019.

8. The network coupling device of claim 7, wherein the at least one transceiver unit is configured to provide a data transmission rate of at least up to 10 Mbits/s for coupling and/or tapping the at least one signal.

9. The network coupling device of claim 1, wherein the at least one terminal unit comprises a port.

10. The network coupling device of claim 9, wherein the port comprises an RJ-45 connection socket.

11. The network coupling device of claim 1, wherein the at least one conversion module is configured to supply the at least one transceiver unit with a clock of 50 MHz.

12. A network, comprising:

at least one network coupling device of claim 1.

13. The network coupling device of claim 1, wherein the control unit is configured according to the Gigabit Ethernet data transmission standard.

14. The network coupling device of claim 1, wherein the at least one appliance comprises a terminal device.

15. The network coupling device of claim 1, wherein the at least one appliance comprises an end device.

16. The network coupling device of claim 1, wherein the at least one appliance comprises a field device.

17. The network coupling device of claim 16, wherein the field device is at a field level.

18. The network coupling device of claim 1, wherein the at least one appliance comprises at least one of a sensor, an actuator, a switch, and a control element.

19. The network coupling device of claim 1, wherein the at least one appliance comprises an operating element.

* * * * *